United States Patent
Lee et al.

(10) Patent No.: US 9,036,039 B2
(45) Date of Patent: May 19, 2015

(54) APPARATUS AND METHOD FOR ACQUIRING FACE IMAGE USING MULTIPLE CAMERAS SO AS TO IDENTIFY HUMAN LOCATED AT REMOTE SITE

(71) Applicant: ELECTRONICS AND TELECOMMUNICATIONS RESEARCH INSTITUTE, Daejeon (KR)

(72) Inventors: Han Sung Lee, Yongin (KR); Dae Sung Moon, Daejeon (KR); Yongjin Lee, Daejeon (KR); Jang-Hee Yoo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 169 days.

(21) Appl. No.: 13/668,173

(22) Filed: Nov. 2, 2012

(65) Prior Publication Data

US 2013/0188070 A1    Jul. 25, 2013

(30) Foreign Application Priority Data

Jan. 19, 2012    (KR) .................. 10-2012-0006392

(51) Int. Cl.
*H04N 5/225*    (2006.01)
*H04N 5/228*    (2006.01)
*H04N 5/232*    (2006.01)
(Continued)

(52) U.S. Cl.
CPC .......... *H04N 5/23219* (2013.01); *H04N 5/225* (2013.01); *H04N 5/228* (2013.01); *G06K 9/00255* (2013.01); *G06K 9/209* (2013.01); *G06K 2009/3291* (2013.01); *G06T 7/2033* (2013.01); *G06T 2207/10016* (2013.01); *G06T 2207/20076* (2013.01); *G06T 2207/20081* (2013.01); *G06T 2207/30201* (2013.01); *G06T 2207/30232* (2013.01)

(58) Field of Classification Search
CPC ............................... H04N 5/225; H04N 5/228
USPC ................................................ 348/222.1, 169
See application file for complete search history.

(56) References Cited

U.S. PATENT DOCUMENTS 6,246,790 B1 *   6/2001   Huang et al. .................. 382/162
6,424,736 B1 *   7/2002   Meitzler et al. ............... 382/155
(Continued)

FOREIGN PATENT DOCUMENTS

KR    10-2011-00513080 A    5/2011

*Primary Examiner* — Nicholas Giles
*Assistant Examiner* — Abdelaaziz Tissire (57) ABSTRACT

An apparatus for acquiring a face image using multiple cameras so as to identify a human being located at a remote site is disclosed. The apparatus for acquiring a face image using multiple cameras allows a PTZ camera to track an interest object from among objects detected/tracked by a fixed camera, and obtains an optimum face image for remote human identification from images generated by the PTZ camera. The apparatus for acquiring the face image using multiple cameras so as to identify a human located at a remote site includes a multi-camera control module for tracking an interest object being detected/tracked by a fixed camera through a Pan-Tilt-Zoom (PTZ) camera, and generating an image of the interest object; and a face-image acquisition module for acquiring a face image appropriate for identifying a face image of the remote human in the interest object image generated by the multi-camera control module.

10 Claims, 5 Drawing Sheets

(51) Int. Cl.
*G06K 9/00* (2006.01)
*G06K 9/20* (2006.01)
*G06T 7/20* (2006.01)
*G06K 9/32* (2006.01)

(56) References Cited

U.S. PATENT DOCUMENTS

| | | | |
|---|---|---|---|
| 7,636,105 B2 | 12/2009 | Sun et al. | |
| 7,848,548 B1* | 12/2010 | Moon et al. | 382/118 |
| 2003/0071891 A1* | 4/2003 | Geng | 348/39 |
| 2004/0136574 A1* | 7/2004 | Kozakaya et al. | 382/118 |
| 2005/0084154 A1* | 4/2005 | Li et al. | 382/190 |
| 2006/0140455 A1* | 6/2006 | Costache et al. | 382/118 |
| 2006/0153430 A1* | 7/2006 | Canzler et al. | 382/118 |
| 2007/0236570 A1* | 10/2007 | Sun et al. | 348/159 |
| 2009/0196464 A1* | 8/2009 | Dimitrova et al. | 382/118 |
| 2009/0208097 A1* | 8/2009 | Husseini et al. | 382/162 |
| 2010/0278419 A1* | 11/2010 | Suzuki | 382/155 |
| 2012/0070041 A1* | 3/2012 | Wang | 382/118 |
| 2012/0076408 A1* | 3/2012 | Suk et al. | 382/173 |
| 2012/0120269 A1* | 5/2012 | Capata et al. | 348/222.1 |
| 2012/0316421 A1* | 12/2012 | Kumar et al. | 600/407 |

* cited by examiner

APPARATUS AND METHOD FOR ACQUIRING FACE IMAGE USING MULTIPLE CAMERAS SO AS TO IDENTIFY HUMAN LOCATED AT REMOTE SITE

CROSS-REFERENCE TO RELATED APPLICATIONS

The present application claims priority to Korean patent application number 10-2012-0006392, filed on Jan. 19, 2012, which is incorporated by reference in its entirety.

BACKGROUND OF THE INVENTION

The present invention relates to an apparatus for acquiring a face image using multiple cameras so as to identify a human being located at a remote site, and more particularly to an apparatus for acquiring a face image using multiple cameras, which allows a PTZ camera to track an interest object from among objects detected/tracked by a fixed camera, and obtains an optimum face image for remote human identification from images generated by the PTZ camera.

With the widespread use of closed circuit television (CCTV) cameras, since many limitations occur in monitoring and analyzing to be carried out by a person serving as an administrator and the number of demands for the realtime monitoring function rapidly increases, the demand of an intelligent image monitoring system (also called an intelligent surveillance system) capable of supporting a more efficient image processing method and a more intelligent analyzing method is rapidly increasing.

The typical method for directly monitoring and analyzing images using a person acting as an administrator has a disadvantage in that fatigue of the administrator is increased and his or her concentration is deteriorated as time goes by, such that an intelligent method capable of automatically tracking/analyzing an object from the monitored image is needed.

Therefore, many developers and companies are conducting intensive research into an intelligent video surveillance system to which a video analysis technique (such as detection, classification, and tracking of an object) and biometrics technology are applied, and representative functions of the intelligent video surveillance system correspond to a technique for identifying a person located at a remote site using a camera and a technique for detecting/tracking an object using a camera.

The typical object detection tracking method has been designed to use images acquired by a fixed camera that is capable of capturing a wide-range image at a predetermined magnification. However, a captured image of an interest object (for example, a person or vehicle) within the image received from the fixed camera has very low resolution, so that it is difficult to identify the interest object.

In order to solve the above-mentioned problems, the object detection and tracking technology using on a PTZ camera that is capable of moving in up, down, left, and right directions and can magnify an image at a specific magnification has been widely used. The method for detecting and tracking an object using a PTZ camera is largely classified into a technology for allowing a PTZ camera to independently detect/track an object and a technology for detecting/tracking based on interworking of fixed and PTZ cameras.

The technology for enabling the PTZ camera to independently detect and track the object maps unique/optical information of a general camera to real-world coordinates, such that it can track the object. Generally, the above-mentioned technology zooms in the object to be tracked, controls the camera to be located at the center part of the image and at the same time stores the resultant image, or separates the object (generally, a face image) from the image and stores the separated result.

However, most of the typical object detection/tracking technologies aim to provide higher-definition object information without considering automated remote human identification using object information. In addition, since the object tracking technology controls the camera in such a manner that the interest object is always located at the center part of the image, the image of the interest object may be deteriorated due to excessive number of pan-tilt operations. If the deteriorated image is used as an input signal of the automated remote human identification system, performance or throughput of the system may be greatly deteriorated.

The object detection and tracking technology using a fixed camera and a PTZ camera can enable the PTZ camera to track an interest object using interest region information generated by the fixed camera. In order to interoperate the fixed camera and the PTZ camera, it is necessary for coordinates of an image obtained by the fixed camera to be mapped to physical coordinates of the PTZ camera. However, if installation places of such cameras are changed or if a peripheral environment is changed, a map for coordinates matching between the cameras must be newly updated.

Although the above-mentioned conventional methods have been designed to consider the object detection and tracking technology either using only the PTZ camera or using the fixed and PTZ cameras, it is impossible for the above-mentioned methods to obtain an optimum face image for identification of a human located at a remote site (hereinafter referred to as remote human identification).

The related art of the present invention has been disclosed in Korean Patent Laid-open Publication No. 10-2011-0051308 (published on May 18, 2011), entitled "APPARATUS AND METHOD FOR CAPTURING FACE IMAGE".

SUMMARY OF THE INVENTION

Various embodiments of the present invention are directed to providing an apparatus for acquiring a face image using a PTZ camera for remote human identification that substantially obviates one or more problems due to limitations or disadvantages of the related art.

Embodiments of the present invention are directed to an apparatus for acquiring a face image using multiple cameras so as to identify a human being located at a remote site, which allows a PTZ camera to track an interest object from among objects detected/tracked by a fixed camera, and obtains an optimum face image for remote human identification from images generated by the PTZ camera.

In accordance with an embodiment, an apparatus for acquiring a face image using multiple cameras so as to identify a human located at a remote site includes a multi-camera control module for tracking an interest object being detected/tracked by a fixed camera through a Pan-Tilt-Zoom (PTZ) camera, and generating an image of the interest object; and a face-image acquisition module for acquiring a face image appropriate for identifying a face image of the remote human in the interest object image generated by the multi-camera control module.

The multi-camera control module may include an object tracking unit for detecting and tracking the interest objects in an image captured by the fixed camera; an online learning unit for learning characteristics of each interest object tracked by the object tracking unit in an online mode; and a PTZ camera controller for controlling the PTZ camera by applying fuzzy inference to the interest object online-learned by the online learning unit.

The online learning unit may perform online learning by extracting an object characteristic value of the interest object.

The object characteristic value may include a color model and a texture module.

In order to extract the object characteristic value, the interest object is divided into a plurality of blocks, a color histogram and a local binary pattern (LBP) histogram for each block are calculated and normalized, and the normalized results are summed.

The PTZ camera controller may detect the interest object from an input image using the object characteristic value, perform zoom-in or zoom-out control according to the size of the interest object, adjust the magnitude of pan and tilt output values in response to the zoom-in or zoom-out control, and perform the fuzzy inference through a fuzzy inference engine using center coordinates of the image, such that it performs pan and tile control in response to an output value of the fuzzy inference engine.

The PTZ camera controller may enable the interest object to maintain a predetermined size in such a manner that the interest object is located at a center part of the image captured by the PTZ camera.

The PTZ camera controller may control pan, tilt, and zoom operations of the PTZ camera by adjusting the number and range of fuzzy membership functions in response to the fuzzy inference.

The fuzzy membership function may adjust the number and range of fuzzy membership functions according to a control accuracy of the PTZ camera.

The fuzzy membership function for the center part of the image may be defined as a trapezoidal function.

The face-image acquisition module may include a face detection unit for detecting a face region in the interest object image received from the multi-camera control module; a face-pose estimation unit for estimating a pose of the face detected by the face detection unit; and an image-quality measurement unit for measuring a quality of the interest object image received from the face detection unit.

The face-pose estimation unit may perform learning on the basis of the face image that maintains a predetermined number of angles, wherein an up/down pose and a left/right pose from among poses of the face are estimated using a recursive analysis model.

The face-image acquisition module may select any one of the face images contained in the interest object image received from the multi-camera control module.

DESCRIPTION OF SPECIFIC EMBODIMENTS

Reference will now be made in detail to the embodiments of the present invention, examples of which are illustrated in the accompanying drawings. Wherever possible, the same reference numbers will be used throughout the drawings to refer to the same or like parts. An apparatus for acquiring a face image using multiple cameras so as to identify a human being located at a remote site according to an embodiment of the present invention will be described in detail with reference to the accompanying drawings. In the drawings, line thicknesses or sizes of elements may be exaggerated for clarity and convenience. Also, the following terms are defined considering functions of the present invention, and may be differently defined according to intention of an operator or custom. Therefore, the terms should be defined based on overall contents of the specification.

Figure 1:
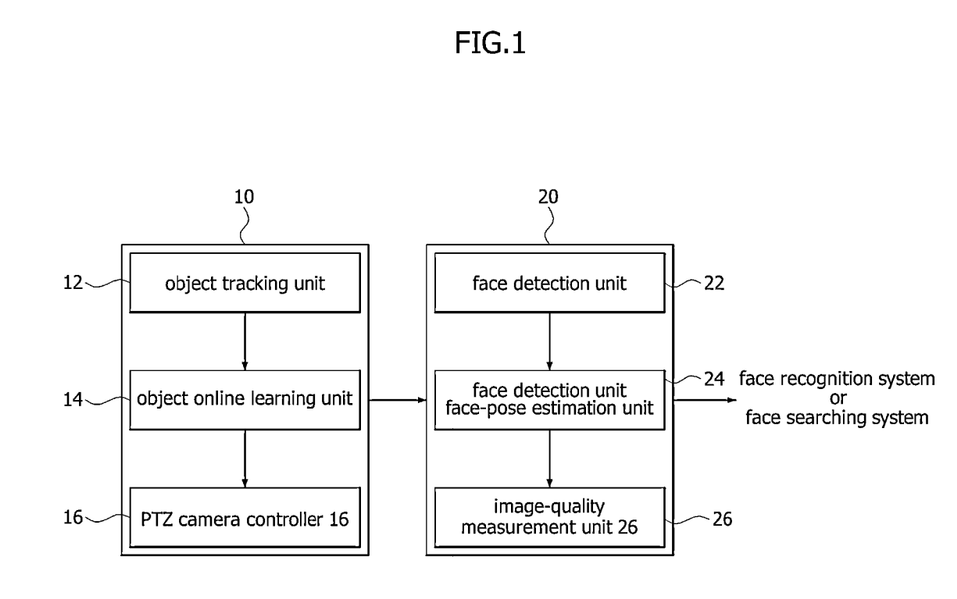
FIG. 1 is a block diagram illustrating an apparatus for acquiring a face image using multiple cameras so as to identify a remote person according to an embodiment of the present invention.
Figure 2:
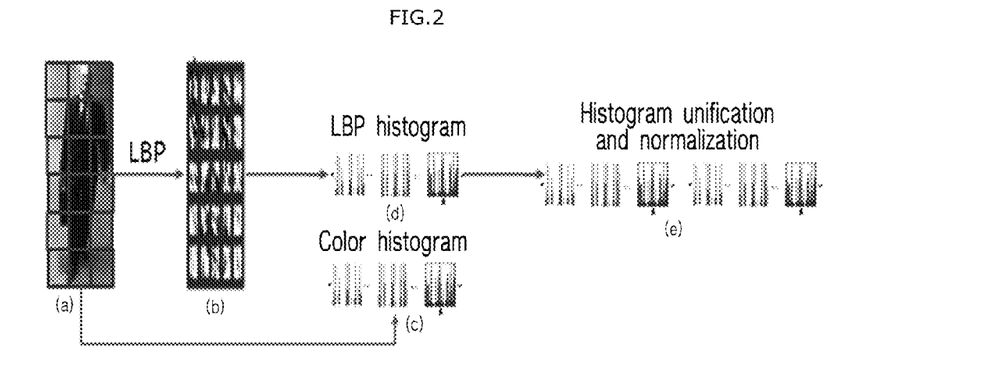
FIG. 2 is a conceptual diagram illustrating a process for extracting an object characteristic value obtained by online learning of an interest object using a PTZ-camera-based object detector according to an embodiment of the present invention.
Figure 3:
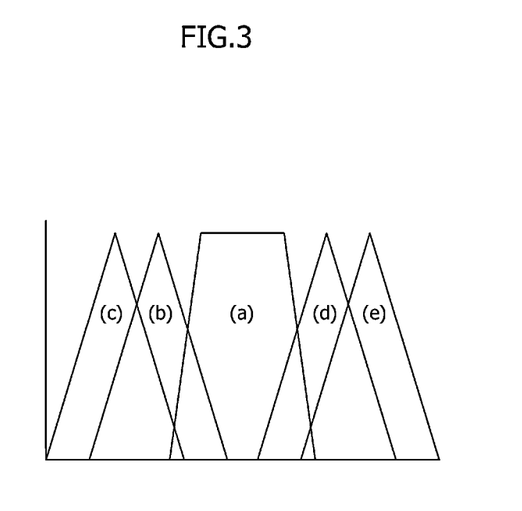
FIG. 3 shows an input membership function of the PTZ camera controller according to an embodiment of the present invention.
Figure 4:
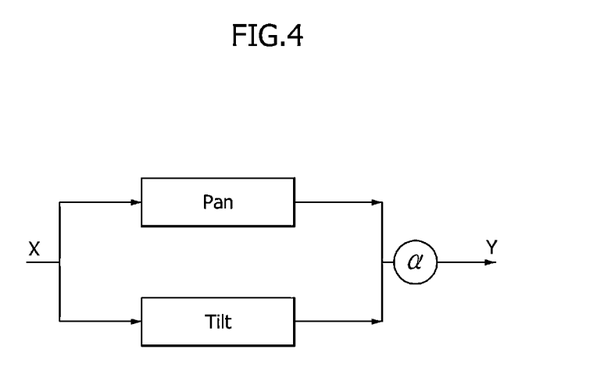
FIG. 4 is a block diagram illustrating a fuzzy inference engine for pan-tilt control according to an embodiment of the present invention.
Figure 5:
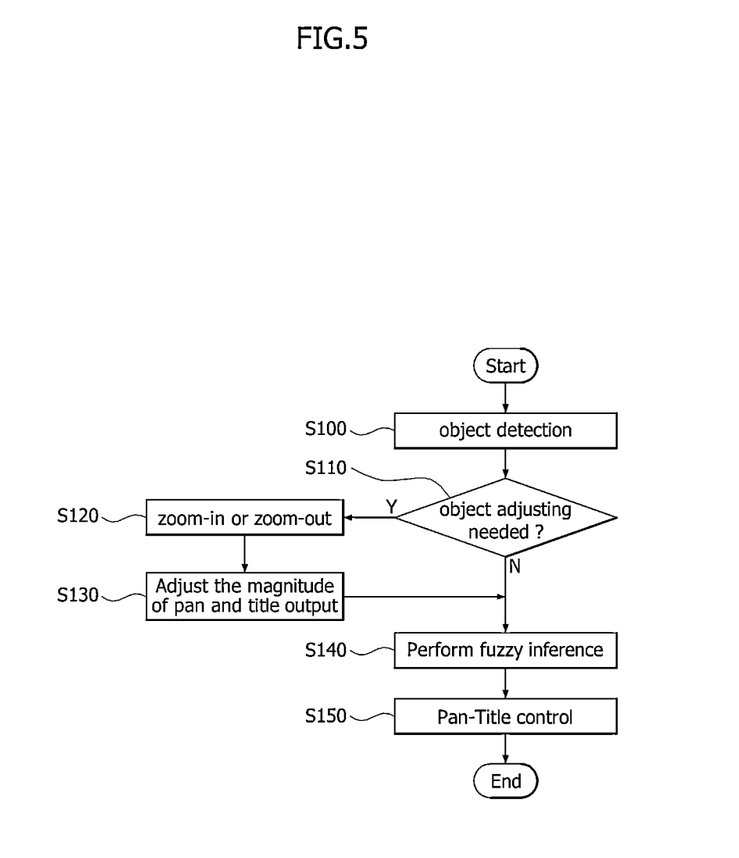
FIG. 5 is a flowchart illustrating a PTZ control process based on fuzzy inference according to an embodiment of the present invention.
Figure 6:
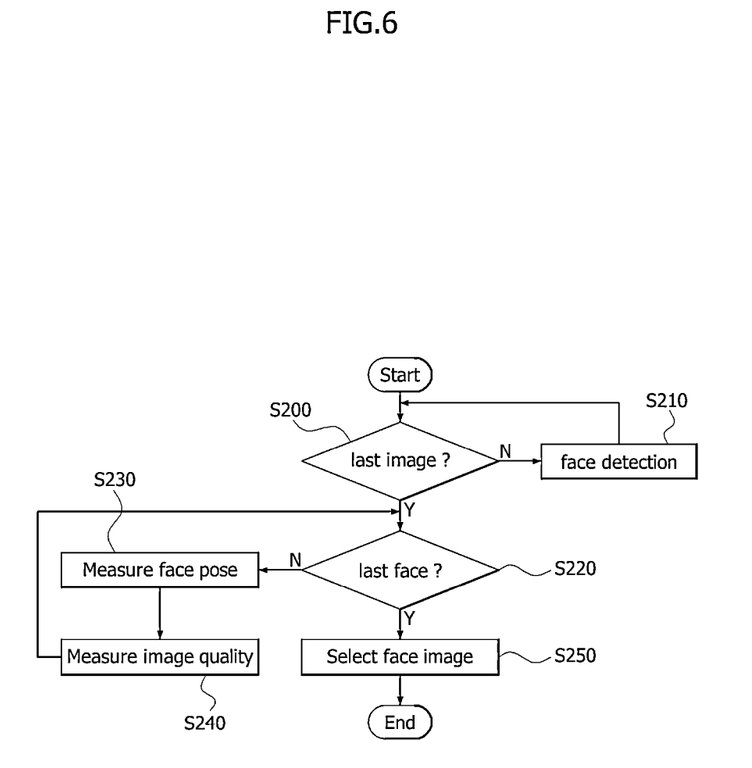
FIG. 6 is a flowchart illustrating a process for selecting a face image according to an embodiment of the present invention.

FIG. 1 is a block diagram illustrating an apparatus for acquiring a face image using multiple cameras so as to identify a remote person according to an embodiment of the present invention. FIG. 2 is a conceptual diagram illustrating a process for extracting an object characteristic value obtained by online learning of an interest object using a PTZ-camera-based object detector according to an embodiment of the present invention. FIG. 3 shows an input membership function of the PTZ camera controller according to an embodiment of the present invention. FIG. 4 is a block diagram illustrating a fuzzy inference engine for pan-tilt control according to an embodiment of the present invention. FIG. 5 is a flowchart illustrating a PTZ control process based on fuzzy inference according to an embodiment of the present invention. FIG. 6 is a flowchart illustrating a process for selecting a face image according to an embodiment of the present invention.

The face-image acquisition apparatus based on multiple cameras so as to identify a human located at a remote site includes a multi-camera control module 10 and a face-image acquisition module 20. If the multi-camera acquisition module 20 acquires an interest-object image of low-deterioration and high-resolution, the face-image acquisition module 20 obtains an optimum face image, that is appropriate for identification of a face image of a human located at a remote site, from the interest-object image acquired by the multi-camera control module 10. The acquired face image is input to a face recognition system (not shown) so as to recognize a face image or is input to a face searching system (not shown) so as to search for a face image.

The multi-camera control module 10 allows a PTZ camera to track an interest object from among a plurality of objects detected/tracked by a fixed camera. The multi-camera control module 10 includes an object tracking unit 12 for detecting and tracking objects in an image generated by the fixed camera (not shown); an object online learning unit 14 that is configured to learn an interest object from among objects being tracked within the fixed-camera image through the tracking unit; and a PTZ camera controller 16 for controlling a PTZ camera by applying fuzzy inference to the interest object online-learned by the object online learning unit 14.

First, the object tracking unit 12 detects the presence or absence of a human in an image captured by the fixed camera, and tracks the detected human.

Particularly, when detecting the presence of a human, the object tracking unit 12 may detect the human using a HoG (Histogram of Oriented Gradient) and a SVM (Support Vector), and a particle filter or the like may be used to track multiple objects.

For reference, it should be noted that the scope or spirit of the object tracking unit 12 is not limited only to the above-mentioned embodiment, and may include a variety of technologies capable of detecting/tracking an object such as a human in the image received from the fixed camera.

The object online learning unit 14 is configured to learn characteristics or features of the interest object from among objects detected/tracked by the object tracking unit 12 in an online mode. In this case, the interest object may be selected in various ways according to system management policies. For example, the interest object may be directly selected by a user, may be selected according to the order of detected objects according to strategies, or may also be selected according to the presence or absence of an abnormal behavior.

In association with the above-mentioned online learning, the apparatus of the present invention extracts an optimum object characteristic value appropriate for object expression, such that it can perform online learning.

When extracting the object characteristic value for the online learning, a color model and a texture model may be used as the most appropriate methods for expressing object information from among the captured images as necessary. Accordingly, the present invention can obtain the object characteristic value using the color model and the texture model.

The process for extracting object characteristic values through online learning will hereinafter be described with reference to FIG. 2.

Referring to FIGS. 2(*a*) and 2(*b*), an interest object is divided into a plurality of blocks.

If the interest object is divided into a plurality of blocks as shown in FIG. 2(*b*), the color histogram for each block is calculated as shown in FIG. 2(*c*). Thereafter, the above-mentioned extracting process calculates a Local Binary Pattern (LBP) corresponding to texture information as shown in FIG. 2(*d*), and performs unification and normalization of the color histogram and the LBP histogram.

Finally, the color histogram and the LBP histogram are integrated into one histogram using the following equation.

Object characteristic value={$a$×color histogram}+{$(1-a)$×LBP histogram}  [Equation]

As described above, the color histogram and the LBP histogram are combined with each other, such that the features or characteristics of the interest object can be definitely expressed. The histogram is normalized, such that similarity between different-sized objects can be recognized.

The PTZ camera controller 16 performs PTZ control based on fuzzy inference using characteristic values corresponding to the online learning result obtained through the object online learning unit 14. As a result, the PTZ camera controller 16 is less affected by installation environments and obtains high-resolution and low-deterioration object images.

The PTZ control indicates that Pan-Tilt-Zoom (PTZ) control operations in such a manner that the interest object maintains a predetermined size and at the same time is located at the center part of the image captured by the PTZ camera. The Pan-Tilt-Zoom (PTZ) operations are controlled using a fuzzy membership function for an input signal shaped as shown in FIG. 3.

Referring to FIG. 3, a trapezoid membership function (a) located at the center part of the fuzzy membership function may indicate a "horizontal or vertical center" of the image.

In addition, the fuzzy membership function (b) located at the left on the basis of the trapezoid membership function (a) may indicate "slightly to the left or slightly to down", and the fuzzy membership function (c) may indicate "greatly to the left or greatly to down".

The fuzzy membership function (d) located at the right on the basis of the trapezoid membership function (a) may indicate "slightly to the right or slightly to up", and the fuzzy membership function (e) may indicate "greatly to the right or greatly to up".

The fuzzy membership functions (a)~(e) shown in FIG. 3 are disclosed only for illustrative purposes, and the number of membership functions and the range thereof may be adjusted according to the system accuracy.

In accordance with the embodiment of the present invention, the center function is defined as a trapezoidal function, such that no pan-tilt control is performed when the tracking object does not excessively deviate from the center part. As a result, an unnecessary control range of the PTZ camera is removed, and image deterioration elements such as motion blur or the like can be reduced. In addition, the width of an upper surface of the central trapezoidal function is adjusted so that the accuracy of PTZ control can be adjusted.

FIG. 4 shows an operation used when two control values are summed in a general fuzzy operation. As can be seen from FIG. 4, two control values for pan-tilt control are used as an input signal (x), and an actual operator signal (y) for pan-tilt control is then output. In FIG. 4, although 'a' is an operator used when the fuzzy relationship equations are connected in parallel and may be represented by a union or intersection as necessary, it should be noted that the technical range or spirit of the present invention is not limited thereto.

In the case of using the zoom operation according to the above-mentioned operation, the fuzzy inference engine may zoom in or out from the object image displayed on the screen until the size of object reaches a predetermined size. In this case, a pan control output value and the size of tilt control output value are adjusted according to the zoom-in or zoom-out operation.

Referring to FIG. 5, the PTZ control process based on the above-mentioned fuzzy inference engine detects an object from an input image using an object characteristic value of the online learning of the interest object entered by the object online learning unit 14 (Step S100).

The PTZ control process shown in FIG. 5 determines the size of the detected object and determines whether object adjustment is needed (Step S110). If the object adjustment is needed, zoom-in or zoom-out control is performed according to the size of the detected object. If the detected object is small in size, the zoom-in control is performed. If the detected object is large in size, the zoom-output control is performed (Step S120).

In addition, the magnitude of pan-tilt output values is adjusted according to the zoom-in or zoom-out operation (Step S130).

In this way, provided that the magnitude of pan-tilt output values is adjusted and object adjustment is not needed for the step S110, fuzzy inference is performed through the above-mentioned fuzzy inference engine on the basis of the center coordinates of the object (Step S140), and pan-tilt control is performed according to the output value of the fuzzy inference engine (Step S150).

According to the pan and tile control result, the above-mentioned steps may be repeated until a stop condition for stopping the pan and tilt control is satisfied.

The face-image acquisition module 20 may acquire an optimum face image, that is appropriate for identification of a face image of a human located at a remote site, in the image acquired by the multi-camera control module 10. The face-image acquisition module 20 includes a face detection unit 22 for detecting a face image in the object image acquired from the multi-camera control module 10; a face-pose estimation unit 24 for estimating the pose of the detected face; and an image-quality measurement unit 26 for measuring the quality of the face image.

The face-image acquisition module 20 selects an optimum face image appropriate for identifying the face image of a remote human in consideration of the face pose and image quality of the face image acquired from the multi-camera control module 10, and uses the selected face image to identify and search for a face image of the human located at a remote site.

The face detection unit 22 may detect a face region from a high-resolution and low-deterioration object image acquired from the multi-camera control module 10. The face detection unit 22 may use an adaptive boosting (also called 'adaboosting') method, a cascading method, an omega shape model, etc. However, the technical scope of the present invention is not limited thereto, and may include all of various technologies applicable to face acquisition.

The face-pose estimation unit 24 may estimate the pose of a face image received from the face detection unit 22.

The face-pose estimation unit 24 may estimate the face pose through recursive analysis that uses characteristic points of a two-dimensional (2D) face image as an input.

Generally, it is very difficult to learn the face pose using learning data including all angles of the face. Therefore, the embodiment of the present invention performs desired learning only using face images each maintaining some angles, and uses a recursive analysis module so as to estimate an unlearned face pose.

The face poses are classified into a vertical (up/down) pose, a horizontal (left/right) pose, and a rotation pose. The rotation pose of the face can be corrected using simple linear modification, and it is not necessary to make an additional recursive analysis model. A recursive analysis model capable of measuring the up/down pose from among the face poses and another recursive analysis model capable of measuring the left/right pose from among the face poses are constructed.

For example, characteristic points of the face may be detected either by eye and lip detection using Average of Synthetic Exact Filter (ASEF) filter or the like, or by face-outline detection using a sketch operator, etc. The recursive analysis module may use a Support Vector Regression (SVR) model, a neural network, a non-linear recursive analysis model, etc. The above-mentioned exemplary models are disclosed only for illustrative purposes, and the technical range of the present invention is not limited thereto, and may include a variety of technologies to extract characteristic points of the face.

The image-quality measurement unit 26 may be adapted to measure the quality of an image received from the face detection unit 22, and may use a method for measuring the image quality based on no reference so as to measure the image blocking effect or image blur.

The aforementioned face-image acquisition process can select an optimum face image appropriate for identifying/searching a face image of a human located at a remote site in consideration of the face-pose measurement value and the image quality on the basis of the detected face images, and as such a detailed description thereof will hereinafter be described with reference to FIG. 6.

Referring to FIG. 6, the face detection unit 22 receives an interest-object image from the multi-camera control module 10 and detects a face image from the received interest-object image. The above-mentioned processes are repeated until the PTZ camera cannot track the object any longer (Steps S200 and S210).

Therefore, if the corresponding image is determined to be the last image, the face-pose estimation unit 24 can estimate the face pose using the face image detected by the face detection unit 22 at each face image, and the image quality measurement unit 26 can select an optimum face image appropriate for face identification of a human located at a remote site (Steps S220~S250).

As is apparent from the above description, the face-image acquisition apparatus according to the present invention performs PTZ control based on online object learning and fuzzy inference so as to reduce the number of unnecessary movements of the PTZ camera, such that it can track an object in response to the object movement and the zooming degree without being affected by the installation environment. In addition, the face-image acquisition apparatus reduces the number of unnecessary PTZ movements, such that image-quality deterioration such as motion blur can be reduced. Therefore, the face-image acquisition apparatus according to the present invention can be applied not only to a variety of image security technique fields but also robotics and vehicles.

In addition, the face-image acquisition apparatus according to the present invention is applied to a variety of industrial fields such as image security, robotics, vehicles, etc., resulting in activation of many industrial fields. Accordingly, the apparatus of the present invention can be used as the important technology for identifying and searching for a human being located at a remote site.

The apparatus of the present invention obtains an optimum face image appropriate for identification and searching of a face image of a remote human from a high-resolution object image obtained through control of multiple cameras (i.e., a fixed camera and a PTZ camera), such that it can be applied not only to an intelligent image-security field and remote-human identification and searching fields, but also to a variety of application fields (for example, suspect or dangerous person searching, missing child searching, etc.).

While the present invention has been described with respect to the specific embodiments, it will be apparent to those skilled in the art that various changes and modifications may be made without departing from the spirit and scope of the invention as defined in the following claims.

What is claimed is:

1. An apparatus for acquiring a face image using multiple cameras so as to identify a human located at a remote site, comprising:
   a multi-camera control module for tracking an interest object being detected and tracked by a fixed camera through a Pan-Tilt-Zoom (PTZ) camera, and generating an image of the interest object; and
   a face-image acquisition module for acquiring a face image appropriate for identifying a face image of the remote human in the interest object image generated by the multi-camera control module,
   wherein the multi-camera control module includes:

an object tracking unit for detecting and tracking the interest objects in an image captured by the fixed camera;

an online learning unit for learning characteristics of each interest object tracked by the object tracking unit in an online mode; and a PTZ camera controller for controlling the PTZ camera by applying fuzzy inference to the interest object online-learned by the online learning unit, and wherein the PTZ camera controller detects the interest object from an input image using an object characteristic value, performs zoom-in or zoom-out control according to a size of the interest object, adjusts a magnitude of pan and tilt output values in response to the zoom-in or zoom-out control, and performs the fuzzy inference through a fuzzy inference engine using center coordinates of the image and based on the magnitude of the pan and tilt output values, and wherein the PTZ camera controller controls pan, tilt, and zoom operations of the PTZ camera based on an output value of the fuzzy inference engine.

2. The apparatus according to claim 1, wherein the online learning unit performs online learning by extracting the object characteristic value of the interest object.

3. The apparatus according to claim 2, wherein the object characteristic value includes a color model and a texture module.

4. The apparatus according to claim 2, wherein, in order to extract the object characteristic value, the interest object is divided into a plurality of blocks, a color histogram and a local binary pattern (LBP) histogram for each block are calculated and normalized, and the normalized results are summed.

5. The apparatus according to claim 1, wherein the PTZ camera controller enables the interest object to maintain a predetermined size in such a manner that the interest object is located at a center part of the image captured by the PTZ camera.

6. The apparatus according to claim 1, wherein the number and range of fuzzy membership functions are adjusted according to a control accuracy of the PTZ camera.

7. The apparatus according to claim 1, wherein the fuzzy membership function for the center part of the image is defined as a trapezoidal function.

8. The apparatus according to claim 1, wherein the face-image acquisition module includes:
a face detection unit for detecting a face region in the interest object image received from the multi-camera control module;
a face-pose estimation unit for estimating a pose of the face detected by the face detection unit; and
an image-quality measurement unit for measuring a quality of the interest object image received from the face detection unit.

9. The apparatus according to claim 8, wherein the face-pose estimation unit performs learning on the basis of the face image that maintains a predetermined number of angles, wherein an up/down pose and a left/right pose from among poses of the face are estimated using a recursive analysis model.

10. The apparatus according to claim 8, wherein the face-image acquisition module selects any one of the face images contained in the interest object image received from the multi-camera control module.

* * * * *